United States Patent [19]

Hansen et al.

[11] Patent Number: 5,780,130
[45] Date of Patent: Jul. 14, 1998

[54] CONTAINER AND METHOD OF MAKING CONTAINER FROM POLYETHYLENE NAPHTHALATE AND COPOLYMERS THEREOF

[75] Inventors: Jeffrey E. Hansen, Acworth, Ga.; Kunio Osakada, Kawasoki, Japan; Michael J. Myers, Lawrenceville, Ga.

[73] Assignee: The Coca-Cola Company, Atlanta, Ga.

[21] Appl. No.: 775,309

[22] Filed: Dec. 31, 1996

Related U.S. Application Data

[63] Continuation of Ser. No. 329,859, Oct. 27, 1994, abandoned.

[51] Int. Cl.$^6$ .............................. B65D 90/02; B65D 1/02
[52] U.S. Cl. ................ 428/35.7; 428/36.9; 428/36.92; 428/480; 428/542.8; 428/910; 215/374; 215/379; 215/382; 264/532
[58] Field of Search .......................... 215/379, 382, 215/375, 374; 428/35.7, 36.92, 480, 542.8, 220, 910, 36.9, 532, 537

[56] References Cited

U.S. PATENT DOCUMENTS

| | | | |
|---|---|---|---|
| 4,355,728 | 10/1982 | Yoshino et al. | 215/375 |
| 4,407,651 | 10/1983 | Beck et al. | 432/11 |
| 4,472,556 | 9/1984 | Lipowitz et al. | 525/106 |
| 4,540,544 | 9/1985 | Jakobsen et al. | 264/532 |
| 4,863,046 | 9/1989 | Collette et al. | 215/381 |
| 4,959,421 | 9/1990 | Hirahara et al. | 525/437 |
| 5,006,613 | 4/1991 | Shepard et al. | 525/444 |
| 5,039,780 | 8/1991 | Hashimoto et al. | 528/194 |
| 5,066,528 | 11/1991 | Krishnakumar et al. | 428/36.92 |
| 5,085,904 | 2/1992 | Deak et al. | 428/35.7 |
| 5,102,705 | 4/1992 | Yammoto et al. | 428/36.92 |
| 5,104,706 | 4/1992 | Krishnakumar et al. | 215/375 |
| 5,281,387 | 1/1994 | Collette et al. | 264/530 |
| 5,303,834 | 4/1994 | Krishnakumar et al. | 215/381 |
| 5,310,857 | 5/1994 | Jones et al. | 528/220 |
| 5,381,910 | 1/1995 | Sugiura et al. | 215/389 |

FOREIGN PATENT DOCUMENTS

51-16207  5/1993  Japan .
53-30535  12/1993  Japan .

*Primary Examiner*—Rena L. Dye
*Attorney, Agent, or Firm*—Birch, Stewart, Kolasch & Birch, LLP

[57] ABSTRACT

The present invention is directed to a pourable, hot wash, refillable container comprising a base, a cylindrical body having an average side wall thickness of at least 0.635 mm, a shoulder portion, and a neck portion, the pourable, hot wash, refillable container being composed of polyethylene napthalate or a copolymer thereof, the refillable container being capable of undergoing multiple trips through a washing, filling, shipping and consumer use cycle, and the base of the container having sufficient impact resistance so that the container will not break when dropped one meter onto a concrete surface when filled with water at both 4.4° C. and 22.2° C. The invention is further directed to a method for manufacturing a pourable, hot wash, refillable container, which comprises the steps of forming a preform of the container composed of polyethylene napthalate or a copolymer thereof, and molding said preform to form a pourable, hot wash, refillable container.

18 Claims, 2 Drawing Sheets

CONTAINER AND METHOD OF MAKING CONTAINER FROM POLYETHYLENE NAPHTHALATE AND COPOLYMERS THEREOF

This application is a continuation of application Ser. No. 08/329,859 filed on Oct. 27, 1994, now abandoned.

BACKGROUND OF THE INVENTION

The present invention relates to a method for manufacturing plastic containers such as pourable, hot wash, refillable containers and to pourable, hot wash, refillable containers per se.

Conventional containers made of polyethylene terephthalate (PET) resins are sometimes not suitable for pourable, hot wash, refillable packaging. That is, conventional PET resins are not capable of withstanding elevated washing temperatures and thereafter making multiple trips through the demanding washing, filling, shipping and consumer use cycles typically established for refillable carbonated and non-carbonated products without being damaged.

Conventional hot fill containers are filled with hot, virtually sterile product. However, such containers are not suitable as hot wash, refillable bottles, which are capable of undergoing multiple cycles of washing, refilling, shipping, etc. Thus, conventional hot-fill bottles are designed for "one way" trips or "one time" use and they are not suitable for reuse.

There is also a need in the art for hot fill containers having improved barrier properties, so that the flavor of the product previously provided in the container is not absorbed into the container, thereby contaminating subsequent products placed into the container.

U.S. Pat. No. 5,303,834 to Krishnakumar et al., which is herein incorporated by reference in its entirety, relates to a squeezable hot fill container with a paneled side wall which resists permanent deformation or denting when squeezed. The container includes a stepped vacuum panel profile for greater flexibility and resilience (bounce back). The post walls (surrounding the vacuum panels) are stiffened to prevent vacuum collapse, by providing a substantially perpendicular junction between the vacuum panel and post wall, sufficient post wall depth, and/or reinforcing ribs in the post walls. However, the squeezable hot fill container of the Krishnakumar et. al. patent is not designed or suitable as a hot wash, refillable container, and it is expressly not designed as a container for pouring.

SUMMARY OF THE INVENTION

Accordingly, it is a primary object of the present invention to provide a pourable, hot wash, refillable container, such as a bottle, which can undergo the multiple washing, filling, shipping and consumer use cycle referred to above.

It is another object of the present invention to provide a method for manufacturing a pourable, hot wash, refillable container capable of overcoming the deficiencies of conventional PET resins.

An additional object of the invention is to design a hot wash container that has superior barrier properties and which can withstand high washing temperatures in order to remove any residues within the container.

The objects of the present invention are fulfilled by providing a pourable, hot wash, refillable container comprising a base, a cylindrical body having an average side wall thickness of at least 0.635 mm, a shoulder portion, and a neck portion, said pourable, hot wash, refillable container being composed of a homopolymer of polyethylene naphthalate or copolymer thereof, said refillable container being capable of undergoing multiple trips through a washing, filling, shipping and consumer use cycle, said container preferably having no deformable vacuum panels, and said base of said container having sufficient impact resistance so that said container will not break when dropped one meter onto a concrete surface when full with water at both 4.4° C. and 22.2° C.

The objects of the present invention are further fulfilled by providing a method for manufacturing a pourable, hot wash, refillable container, which comprises the steps of (i) forming a preform of a container composed of a homopolymer of polyethylene naphthalate or a copolymer thereof, and (ii) molding said preform to form a pourable, hot wash, refillable container comprising a base, a cylindrical body having an average wall thickness of at least 0.635 mm, a shoulder portion, and a neck portion, said refillable container being capable of undergoing multiple trips through a washing, filling, shipping and consumer use cycle, said container preferably having no deformable vacuum panels, and said base of said container having sufficient impact resistance so that said container will not break when dropped one meter onto a concrete surface when filled with water at both 4.4° C. and 22.2° C.

The refillable containers of the invention are capable of withstanding high wash temperatures and have superior barrier properties in order to provide superior protection from flavor carry over.

All percentages are by mole units unless otherwise indicated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects of the present invention and the advantages thereof will become more readily apparent by reference to the following drawings.

DETAILED DESCRIPTION OF PREFERRED EMBODIMENTS

Figure 1:
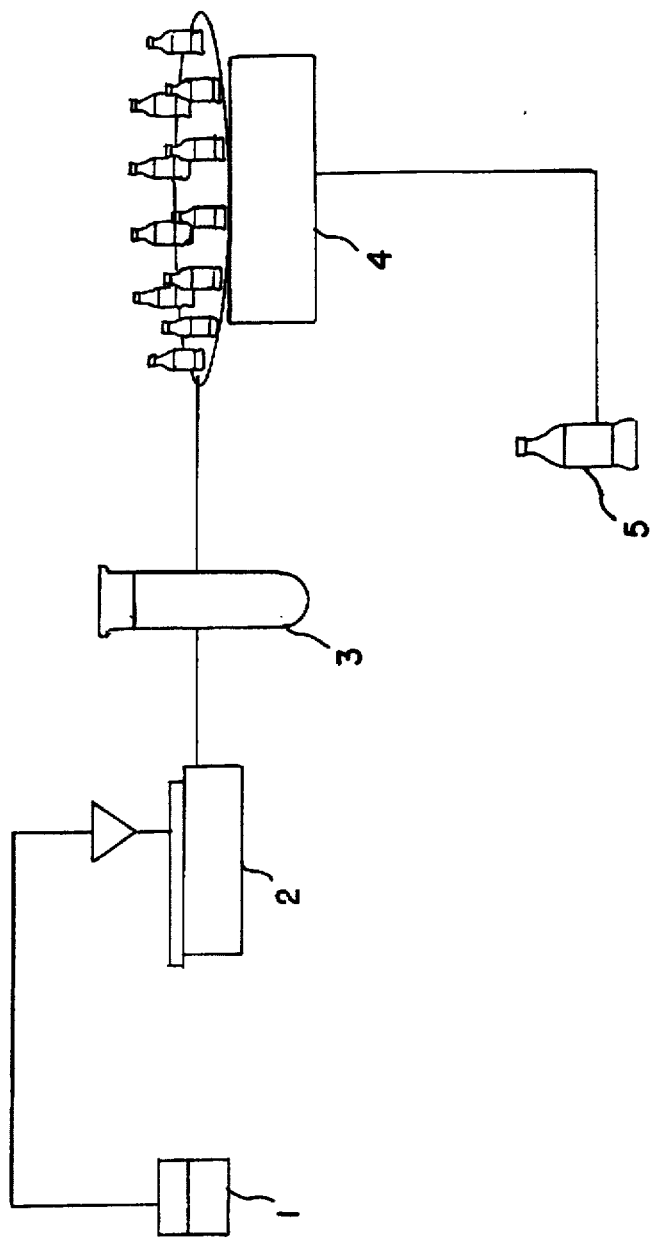
FIG. 1 is a schematic of the process of the present invention.

The present invention relates to the manufacture of pourable, hot wash, refillable containers such as bottles, and to the containers per se. The containers are composed of PEN copolymers comprising at least 51% dimethyl-2,6-naphthilenedicarboxylate (NDC, Amoco Chemical Company) as an acid component and 49% or less comprising some other acid component. Preferably, the containers are composed of PEN copolymers comprising at least 97% NDC and 3% or less comprising some other acid component. Most preferably, the containers comprise 100% NDC (PEN homopolymer) as the acid component.

The acid component of the invention may contain one or more of the following including terephthalic acid, isophthalic acid (IPA), diphenylether 4,4'-dicarboxylic acid, naphthalene-1,4-dicarboxylic acid, adipic acid, sebasic acid, decane 1,10-dicarboxylic acid, cyclohexane dimethanol (CHDM), and hexahydroterephthalic acid. Examples of the residual glycol component are propylene glycol, 1,4-butane diol, neopentyl glycol, diethylene glycol, 2,2-bis(4-hydroxyphenyl)-propane and 2,2-bis(4-hydroxyethoxyphenyl)propane.

Even though PEN has superior physical properties, its use has been limited to applications which can support its high costs, such as in the manufacture of high grade video tape. Because of this high cost, yellow tint, and reduced impact strength as compared with PET, PEN has not been considered well suited for typical container manufacturing. Although not obvious, and in spite of these substantial shortcomings, the inventors have found that PEN is particularly well suited for refillable, hot wash packaging. This is due in part to improvements in resin technology, preform design technology and the unique physical requirements demanded of refillable packaging.

The invention preferably relates to pourable, hot wash, refillable containers for packaging applications in the carbonated and non-carbonated soft drink industry. The manufacturing method to form these containers includes, but is not limited to single stage, two stage, and double blow molding manufacturing systems resulting in a lighter weight bottle as compared to existing PET bottles, having a highly oriented base that is capable of withstanding elevated washing temperatures such as in the range of 80°–85° C. and higher. The resultant container is capable of making multiple trips through the demanding washing/filling/shipping/consumer use distribution cycle typically established for refillable carbonated and non-carbonated products.

Methods for forming containers of the invention include extrusion-blow molding, and preferably injection-blow molding. In extrusion-blow molding a parison is formed by extruding a heat-softened thermoplastic tube and pinching-off the bottom. In injection-blow molding the parison is formed from an injection molded blowable geometric form. The parison or blowable form is then contained within a mold cavity having the volumetric configuration of the desired container and the parison is expanded by blowing it with compressed air within the confines of the mold cavity.

Typical apparatus for molding the refillable container of the invention is disclosed in U.S. Pat. No. 5,229,042 to Denis et al., which is herein incorporated by reference in its entirety. Also, commercially available equipment, as is used in the manufacture of thin walled single use PET beverage containers, may be used to make the containers of the present invention. In addition, commercial equipment like that used in manufacturing conventional thick wall refillable PET containers may also be used.

The container of the invention is rigid and resilient, rather than squeezable. That is, squeezability is undesirable since the inventive container is for pourable applications. Thus, the container of the invention has an average wall thickness of at least 0.635 mm, and more preferably an average wall thickness in the range of 0.635 mm to 0.813 mm, even more preferably in the range of 0.635 mm to 0.711 mm, and most preferably in the range of 0.635 mm to 0.686 mm.

The inventive container does not require flexible vertically elongated panels in the side wall of the container, or stiffer post walls around the panels. Such design features are entirely unnecessary for the container of the invention, which is designed to be stiff so that product does not squeeze out of the container when the container is held by the consumer.

Further, the container of the invention does not require vertically elongated ribs in a post wall to further stiffen the side wall against collapse.

The preferred container is a blow molded biaxially-oriented container made of a homopolymer of PEN, or even more preferably of a copolymer of PEN with another suitable less expensive polymer, wherein the side walls of the container have an average wall thickness on the order of at least 0.635 mm.

A typical container of the invention is 1.5 liters, substantially cylindrical in shape, about 335 mm in height without the cap and about 93.47 mm in outer diameter. The sides of the container are biaxially oriented and radially expanded in a blow mold, and has an average wall thickness of about 0.635 mm. This is considerably thinner than, for instance, the prior known refillable containers which have a wall thickness of about 0.838 mm.

The container of the invention may be blow-molded from a cylindrical injection-molded preform having an open top end and neck finish. The preform has a tapered shoulder-forming portion, substantially uniform thickness along the sides of the cylinder, and a base-forming portion preferably in a champagne design, but including a hemispherical base with a base cup or a footed design such as a petaloid design. The preform is amorphous and substantially transparent and is composed of PEN copolymers comprising at least 51% NDC as an acid component and 49% or less comprising some other acid component. Preferably, the preforms are composed of PEN copolymers comprising at least 97% NDC and 3% or less comprising some other acid component. Most preferably, the preforms comprise 100% NDC (PEN homopolymer) as the acid component. However, other materials and preform shapes can be used, including preforms with thickened base forming portions to provide a thicker container base having improved creep resistance, or preforms with variable wall thickness portions in the side wall if desired.

The base area of the bottle has an orientation and thickness so as to provide sufficient impact resistance. The desired impact resistance may be readily determined by a drop test such that the finished container will not break when it is dropped one meter onto a concrete surface when filled with water to a nominal fill height (i.e. a 1.5 liter bottle contains 1.5 liter water), and then capped. This test is conducted on samples when the liquid in the container is at 4.4° C., and at 22.2° C., respectively. The liquid filled containers are stored for 24 hours at these conditions prior to being dropped onto the concrete surface.

The base of the container of the invention has a thickness sufficient to satisfy the drop test discussed above. Preferably, the base has a thickness of at least 1.27 mm, and more preferably, a thickness in the range of 1.52 to 1.78 mm, most preferably in the range of 1.65 to 1.78 mm.

The preform is placed in a blow molding apparatus having an upper mold section which engages the neck finish, a middle mold section having an interior cavity forming the shape of the container side wall, and a lower mold section having an upper surface forming the outwardly concave dome portion of the container base. In accordance with a standard reheat stretch blow mold process, the injection-molded preform is first reheated to a temperature suitable for stretching and orientation, placed in the blow mold, and an axial stretch rod is then inserted into the open upper end and moved downwardly to axially stretch the preform. Subsequently or simultaneously an expansion gas is introduced into the interior of the preform to radially expand the shoulder, sidewall and base forming portions outwardly into contact with the interior surfaces of mold sections.

The blown container has the same neck finish with outer threads and lowermost neck flange as the preform. The remainder of the bottle has undergone expansion, although to varying degrees. An upper tapered shoulder portion may gradually increase in diameter and orientation while moving downwardly along the bottle. Below the shoulder section may be a radially outwardly projecting upper bumper portion. Below the ornamental panel section where the label may be placed may be a radially outwardly projecting lower bumper, and then a champagne-style base. The base may include an outer base wall gradually reducing in diameter moving downwardly from the upper bumper to a lowermost contact radius on which the bottle rests. Radially inwardly of the contact radius may be a recessed inner base wall or dome having a central gate region. The inner base wall or dome may include a number of symmetrical recessed petaloid portions for increasing the thermal resistance of the base, as is known in the art. In general, the relatively low oriented base has a greater thickness for strength, while the side wall section has a relatively high orientation for strength.

A removable cap is attached to the open upper end of the container. The cap includes a base portion having internal threads which engage the outer threads on the neck finish.

In the container of the invention, there is no need for vacuum panels to be disposed about the vertical centerline of the container. Further, there is no need for post walls in the container of the invention. Moreover, there is no requirement for additional vertically-elongated reinforcing ribs to further stiffen the walls.

The container of the invention may be used for any cosmetic, food, beverage, etc, product which requires a pourable rather than a squeezable container. The product may be pressurized, e.g. carbonated soft drink, or nonpressurized, e.g. juice. In the case of a hot fill product, for instance, juice, vacuum panels could be used. Alternatively, a drop of liquid nitrogen would serve to counter-pressure the container and vacuum panels would not be needed. The container may be used with either hot-fill or cold-fill products wherein the construction provides pourability and refillability. For instance, the reusable container of the invention should be able to withstand hot-fill temperatures in the range of 83°–85° C. and higher, without deformation.

The container may be made in a variety of sizes (volume) and shapes (height and diameter). For example, a twelve ounce pourable (i.e. rather than squeezable), hot wash, refillable PEN container may have a 58.42 mm major diameter and an average wall thickness of at least about 0.635 mm.

The preferred thermoplastic resins useful for making a hot wash refillable container of this invention include a homopolymer of PEN. The intrinsic viscosity of PEN is about 0.6 I.V. to about 0.8 I.V., preferably about 0.7 I.V. When the intrinsic viscosity is less than 0.6 I.V., the mechanical strength of the resulting container is not sufficient. If the intrinsic viscosity is greater than 0.07 I.V., the material is difficult to process. Intrinsic viscosity measurements are made according to the procedure of ASTM D-2857, by employing 0.0050+/−0.0002 g/ml of the polymer in a solvent comprising o-chlorophenol (melting point 0° C.), at 30° C. Intrinsic viscosity (I.V.) is given by the formula:

$$I.V.=(\ln(V\ Soln./V\ Sol.))/C$$

where:

V Soln. is the viscosity of the solution in any units;

V Sol. is the viscosity of the solvent in the same units; and

C is the concentration in grams of polymer per 100 mls of solution.

PEN and PEN copolymer resins useful in this invention are commercially available from Teijin in Japan, Eastman Chemicals in Tennessee, and Shell in Akron Ohio. The materials to make the copolymers are also commercially available. The copolymers may be produced by well known techniques in the art, for instance, by reacting dimethyl-2, 6-naphthalenedicarboxylate (NDC) with terephthalic acid and ethylene glycol. The copolymers may have, for instance, 4–6% by total weight of a comonomer such as 1,4-cyclohexanedimethanol (CHDM) and/or isophthalic acid (IPA).

In making the preferred PEN container from an amorphous preform according to the reheat stretch blow process, a suitable stretching temperature range is about 70°–130° C. It is advisable to stretch the preform about 2–3 times in an axial direction and about 2–4 times in a circumferential direction. In a preferred embodiment of the invention, the preform container stretch ratio is at least 5, preferably 7–9, and more preferably 9–11. Accompanying this stretch ratio is a target base bearing surface thickness of 1.2 mm to 1.7 mm, more preferably 1.2 mm to 1.5 mm.

If desired, a multi-layer preform may be used. However, in the present invention, it should be unnecessary to provide a barrier layer, since PEN provides sufficient barrier properties.

Containers of the invention may contain ornamental panels, but these panels are primarily for design, ornamental use only.

EXAMPLE

With reference to FIG. 1, in step 1, PEN resin is dried at 160° C. for 5 hours or more to obtain a moisture content of 0.005 wt %. Reference Numeral 1 refers to a drier apparatus.

In step 2, PEN resin is heated and processed in an injection molding machine 2 at a temperature of 295° C. for injection into preform molds.

In step 3, the preform is taken from the preform manufacturing operation and either stored for future use or delivered to the reheat blow molding operation. Reference numeral 3 refers to the preform per se.

In step 4, the preform is reheated to about 145° C. and blown into a bottle shape. Reference Numeral 4 refers to a blow molding apparatus.

In step 5, the bottle is packed empty for future filling. Reference Numeral 5 refers to the finished bottle.

Figure 2:
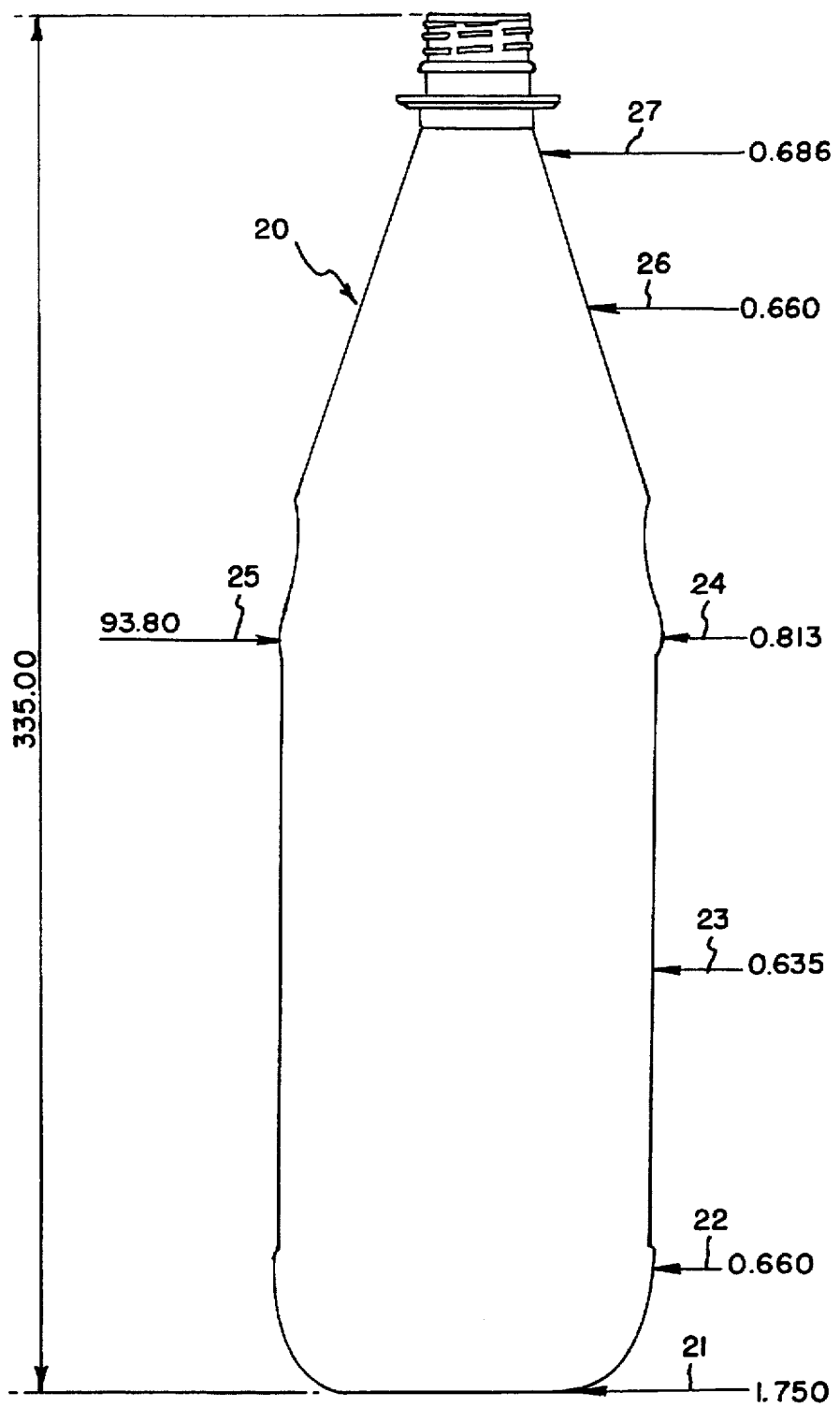
FIG. 2 represents a typical container of the invention.

FIG. 2 represents a typical bottle 20 of the invention. Various thicknesses at the specified portions of the bottle, in millimeters, are shown in FIG. 2. For example, the load bearing surface 21 has an average thickness of 1.750 mm. The heel of the bottle 22 has an average thickness of 0.660 mm. The average side wall or label panel 23 has an average thickness of 0.635 mm. The average thickness of the point (i.e. bumper) 24 where the major diameter 25 is measured is 0.813 mm. The major diameter 25 is 93.80 mm. The average thickness of the lower shoulder 26 is 0.660 mm. The average thickness of the upper shoulder is 0.686.

The invention being thus described, it will be obvious that the same may be varied in many ways. Such variations are not to be regarded as a departure from the spirit or scope of the invention, and all such modifications as would be obvious to one skilled in the art are intended to be included within the scope of the following claims.

What is claimed is:

1. A pourable, hot wash, refillable container comprising a base, a cylindrical body having an average side wall thickness of at least 0.635 mm, a shoulder portion, and a neck portion, said pourable, hot wash, refillable container comprising polyethylene napthalate homopolymer, said container being capable of undergoing multiple trips through a washing, filling, shipping and consumer use cycle, and said base of said container being oriented and having sufficient impact resistance so that said container will not break when dropped one meter onto a concrete surface when filled with water at both 4.4° C. and 22.2° C., said base of said container being oriented by the process of blow-molding a preform wherein the preform stretch ratio is in the range of 5 to 9.

2. The refillable container according to claim 1, wherein said container is a bottle.

3. The refillable container according to claim 1, wherein the container is a blow-molded biaxially-oriented container.

4. The refillable container according to claim 1, wherein the container has an average side wall thickness of about 0.635 mm to about 0.813 mm.

5. The refillable container according to claim 1, wherein the stretch ratio is in the range of 7–9.

6. The refillable container according to claim 1, wherein said container is a 1.5 liter bottle.

7. A pourable, hot wash, refillable container comprising a base, a cylindrical body having an average wall thickness of at least 0.635 mm, a shoulder portion, and a neck portion, said pourable, hot wash, refillable container being composed of a copolymer of polyethylene napthalate comprising at least about 51% dimethyl-2,6-naphthalene-dicarboxylate as an acid component and 49% or less of another acid component, said refillable container being capable of undergoing multiple trips through a washing, filling, shipping and consumer use cycle, and said base of said container being oriented and having sufficient impact resistance so that said container will not break when dropped one meter onto a concrete surface when filled with water at both 4.4° C. and 22.2° C., said base of said container being oriented by the process of blow-molding a preform wherein the preform stretch ratio is in the range of 5 to 9.

8. The refillable container according to claim 7, wherein the container comprises a copolymer of polyethylene napthalate containing 8% or less of an acid component other than dimethyl-2,6-naphthalene-dicarboxylate.

9. The refillable container according to claim 7, wherein said refillable container is a bottle.

10. The refillable container according to claim 7, wherein the container is a blow-molded biaxially-oriented container.

11. The refillable container according to claim 7, wherein the copolymer includes 6% or less of an acid component other than dimethyl-2,6-naphthalene-dicarboxylate.

12. The refillable container according to claim 7, wherein the container has an average side wall thickness of about 0.635 mm to about 0.813 mm.

13. The refillable container according to claim 7, wherein the copolymer of polyethylene napthalate includes 3% or less of an acid component other than dimethyl-2,6-naphthalene-dicarboxylate.

14. The refillable container according to claim 7, wherein the stretch ratio is in the range of 7–9.

15. The refillable container according to claim 7, wherein said container is a 1.5 liter bottle.

16. A pourable, hot wash, refillable container comprising a base, a cylindrical body having an average wall thickness of at least 0.635 mm, a shoulder portion, and a neck portion, said pourable, hot wash, refillable container being composed of a copolymer of polyethylene napthalate comprising at least about 97% dimethyl-2,6-naphthalene-dicarboxylate as an acid component and 3% or less of another acid component, said refillable container being capable of undergoing multiple trips through a washing, filling, shipping and consumer use cycle, and said base of said container being oriented and having sufficient impact resistance so that said container will not break when dropped one meter onto a concrete surface when filled with water at both 4.4° C. and 22.2° C., said base of said container being oriented by the process of blow-molding a preform wherein the preform stretch ratio is in the range of 5 to 9.

17. The refillable container according to claim 16, wherein the stretch ratio is in the range of 7–9.

18. The refillable container according to claim 16, wherein said container is a 1.5 liter bottle.

* * * * *